(Model.)

W. H. KING.
Bit Gage.

No. 242,656.            Patented June 7, 1881.

Witnesses.
Robert Everett
J. A. Rutherford

Inventor
W. Haskell King.
By James L. Norris.
Atty.

UNITED STATES PATENT OFFICE.

W. HASKELL KING, OF ATHOL, MASSACHUSETTS.

BIT-GAGE.

SPECIFICATION forming part of Letters Patent No. 242,656, dated June 7, 1881.

Application filed April 6, 1881. (Model.)

*To all whom it may concern:*

Be it known that I, W. HASKELL KING, a citizen of the United States, residing at Athol, in the county of Worcester and State of Massachusetts, have invented new and useful Improvements in Bit-Stops, of which the following is a specification.

The object of my invention is to enable any number of holes of uniform depth to be bored by a bit or auger without separate measurements, this being accomplished by securing upon the bit or auger a stop to limit the penetration of the same to the desired point, as hereinafter particularly described with reference to the accompanying drawings, in which—

Figure 1:
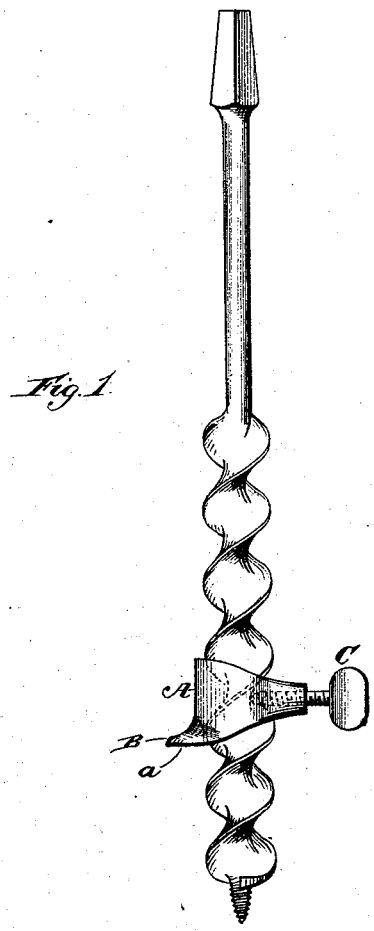
Figure 2:
Figure 3:
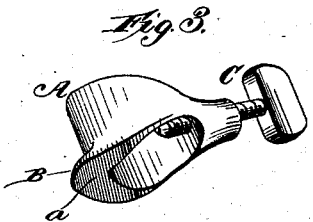

Figure 1 is a view of an auger-bit with a stop applied thereto according to my invention. Figs. 2 and 3 are perspective views of the stop detached.

The stop A consists of a metallic band, preferably of about the diameter of the bit upon which it is to be used. From one edge of the band there projects a nose, B, the outer surface, $a$, of which is flat. The band is preferably thickened at one side, and through the thickened portion is tapped a screw-hole, in which is arranged a thumb-screw, C, the shank of which is adjustable radially in the opening of the band.

In using the stop it is slipped over the end of the bit and adjusted to the desired point, and then the screw is turned in until its tip bears against the broad face of one of the bit threads or spirals, as shown in Fig. 1. The band is not necessarily of the same, or near the same, diameter of the bit, as the screw will hold the stop in place upon a bit of any size which it can receive. The stop being secured in place upon the bit, the nose B strikes the material being bored when the desired depth has been reached and prevents further penetration, while the resistance it opposes to the turning of the bit gives notice to the operator.

The thickened part of the band is made narrower than that portion from which the nose B projects in order to afford room for the escape of chips, which will be brushed to one side by the nose as it nears the surface of the material.

I am aware that auger-stops have been used composed of a pair of jaws hinged or pivoted together and provided with a locking device for attachment to the auger, one of the jaws being provided with an adjustable plate to enable the stop to be adjusted to augers of different sizes, and the stop being provided with legs to allow the escape of chips during the process of boring, and I do not claim such an auger-stop.

What I claim is—

The bit-stop herein described, consisting of the band A, of a single piece, provided at one side of its lower edge with an outwardly-projecting nose, B, having a flat lower face, $a$, said band being narrowed toward the side opposite the nose, and having a laterally-thickened portion provided with a radially-adjustable thumb-screw, C, substantially as shown and described.

In testimony whereof I have hereunto set my hand in the presence of two subscribing witnesses.

W. HASKELL KING.

Witnesses:
THOS. O. GINKINGER,
WM. H. SMITH.